United States Patent Office 3,733,221
Patented May 15, 1973

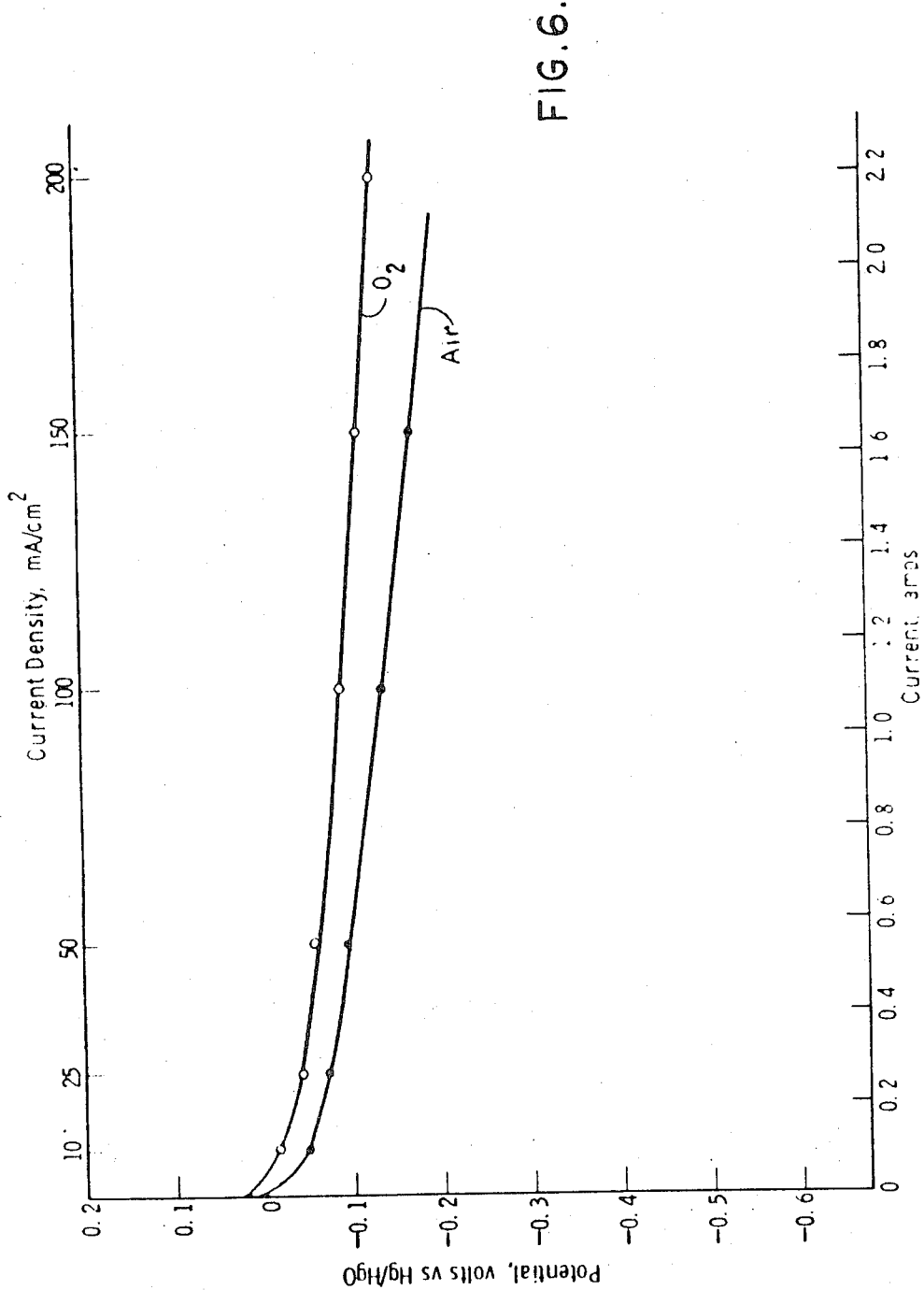

3,733,221
GAS DIFFUSION ELECTRODE
Yehuda L. Sandler, Pittsburgh, and Docile D. Durigon, Irwin, Pa., assignors to Westinghouse Electric Corporation, Pittsburgh, Pa.
Continuation-in-part of application Ser. No. 776,636, Nov. 18, 1968. This application Jan. 27, 1971, Ser. No. 110,126
Int. Cl. H01m 13/00
U.S. Cl. 136—120 FC
4 Claims

ABSTRACT OF THE DISCLOSURE

A gas diffusion electrode for use with a liquid electrolyte in an electrochemical cell, which electrode includes a porous electrical conductor between two porous layers. The first porous layer on the liquid electrolyte side is composed of a conducting material and a binder. The second layer of a thickness of from 3 to 7 mils is on the gas side and contains a conducting material, a binder, and a catalyst; and it is less than about one-half as thick as the first layer and more hydrophobic, whereby gas diffusion rates are optimized and the catalyst is employed in a highly efficient manner.

CROSS-REFERENCE TO RELATED APPLICATIONS

This application is a continuation-in-part of pending application Ser. No. 776,636, filed Nov. 18, 1968, now abandoned.

BACKGROUND OF THE INVENTION

Field of the invention

This invention relates to electrochemical cells, such as fuel cells or hybrid metal-gas cells and, more particularly, it pertains to electrodes for such cells.

Description of the prior art

Fuel cells, such as batteries, are electrochemical devices which convert the chemical energy in a fuel directly into eletrical energy by the oxidation of fuel supplied to the cell. The ordinary fuel cell is composed of two gas diffusion electrodes adjacent to and in contact with an electrolyte, with means for supplying a gaseous fuel to one electrode and a gaseous oxidant to the other electrode. In a gas diffusion electrode the gas penetrates by diffusion to a three-phase zone which is a narrow electrochemically active zone or interface where the gas and liquid electrolyte meet, and electrically conductive and catalyst containing solid particles of the electrode are present. The chemical reactor of this zone results in an electrical current that flows to a metal grid or the like. A gas diffusion electrode is also used in certain hybrid batteries. In these the gas diffusion electrode is generally supplied with air or oxygen and is paired with a metal electrode. The chemical energy of oxidation of a fuel or of the metal is converted into electrical energy.

A catalyst is usually used to accelerate the electrode reaction on gas electrodes. In most prior diffusion electrodes the catalyst has been distributed on the electrolyte side or throughout the electrode which is wasteful and expensive where the catalyst is platinum, gold or silver, because the catalyst is not used efficiently or effectively. Ideally, the catalyst is most effective when it is located only at the active interface where the electrolyte, electrode, and gas meet.

In addition, the rate of diffusion of the active components in a gas mixture, such as the oxygen in air, is decreased when the active interface is located too far from the gas side of the electrode. Fast diffusion is essential, particularly where the gas is a mixture, such as air, because the nitrogen in the air accumulates in the electrode pores and prevents the oxygen from getting to the interface. The thickness of the gas entrance side layer to the active zone or interface is critical for both optimum life and good electrode operation.

A common weakness of gas diffusion electrodes is the occurrence of "sweating" which is the formation of tiny drops of electrolyte on the gas side of the electrode due to slight penetration of the electrolyte. To avoid penetration of the electrode by the electrolyte, two methods are commonly used. One is the partial waterproofing of the electrode as also adopted in the present invention; the other is a dual porosity electrode ("double skeleton electrode") in which a meniscus, formed by the electrolyte in the pores of the electrode is maintained by gas pressure at the interface between two layers of different pore sizes. In either case, inhomogeneities and defective spots, that may be formed during production of the electrodes or usually develop during their prolonged use, may cause local penetration of the electrode by the electrolyte, which may cause partial or total failure of the output. It is one of the aspects of the present invention to render such deficiency essentially innocuous.

In the most revelant known prior art, U.S. Pat. No. 3,306,779 discloses a fuel cell electrode having two adjacent layers containing a current collector at least one of which layers is wettable by the electrolyte of the fuel cell. However, the patent does not disclose the provision of gas-side layer having a thickness equal at most to only one half the thickness of the electrolyte-side layer. Nor does the patent disclose the addition of a catalyst only to the gas-side layer. Both of those conditions are conducive to an electrode having a shorter diffusion path for the gas and a consequent lower catalyst requirement with a resulting higher output than was heretofore attainable with such prior known electrodes.

Other prior art is constituted by U.S. Pats. 3,423,247; 3,480,538; 3,451,856 and 3,576,601. These patents do not teach a gas diffusion electrode having a gas side layer which is from 3 to 7 mils in thickness and the necessary catalyst is disposed only therein, associated with a liquid electrolyte side layer which is at least twice as thick as the gas side layer, the layers being disposed on either side of an apertured or porous metallic conductor.

SUMMARY OF THE INVENTION

It has been found in accordance with this invention that the foregoing prior art shortcomings may be overcome by providing a gas diffusion electrode having a gas-entrance side layer and a liquid electrolyte contacting side layer, the electrode comprising a porous metal conductor, and these layers comprising essentially a coherent porous material bonded to each side of the porous metal conductor, the layers consisting essentially of particles of an electrically conductive carbonaceous material inert to the electrolyte as a major component and a resinous binder inert to the electrolyte uniting the particles of carbonaceous material; the resinous binder in the gas-entrance side layer rendering it hydrophobic and being present in an amount of from about 20 to 50 weight percent of the total composition of the layer; a catalyst distributed essentially only within the gas-entrance side layer; the gas-entrance side layer being from about 3 to about 7 mils in thickness while the thickness of the liquid electrolyte contacting side layer is at least about twice the thickness of the gas contacting layer, whereby the gas side layer provides for a minimum gas diffusion path with a resulting optimized rate of reaction. Such electrodes have extraordinary operating lives at a high efficiency.

By such construction, the catalyst is applied in the most efficient and effective way and at the same time the path of gas diffusion is as short as possible to enhance the rate of diffusion and therefore the rate of the electrochemical reaction. Short diffusion paths are provided for inert components of a gas mixture, such as nitrogen when air is fed to the electrodes, to permit the nitrogen to escape rapidly and thereby enhance the diffusion rate of oxygen.

Moreover, means for removing any electrolyte that may seep through the electrode is provided on the air side of the electrode.

BRIEF DESCRIPTION OF THE DRAWINGS

For a better understanding of the nature and objects of this invention, reference is made to the drawings, in which:

FIG. 6 is a graph showing the characteristics of an electrode operated with oxygen and with air in a 30% solution of KOH at ambient temperature, the current being plotted against potential as measured against an Hg/HgO reference electrode.

DESCRIPTION OF THE PREFERRED EMBODIMENT

Figure 1:
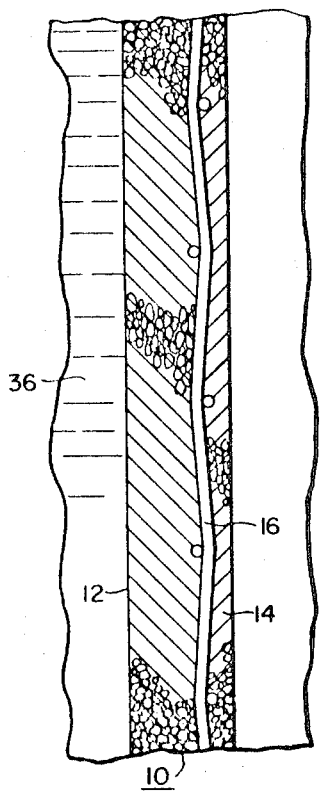
FIG. 1 is a schematic view through a gas diffusion electrode showing a layer on one side and a layer on the other side of a metal conductor member.

In FIG. 1 an electrode 10 is schematically illustrated with two layers including a backing layer 12 and a catalyzed layer 14. The layers 12 and 14 are mounted on opposite sides of a conductor 16.

The backing or liquid electrolyte contacting layer 12 is composed of particles of a material selected from a group consisting of carbon, graphite, and boron carbide, and mixtures thereof. In addition, the layer 12 includes a binder for holding the particles together, the binder being composed of a fluorocarbon polymer (such as polytetrafluoroethylene) polysulfone resin, polyethylene latex, or polypropylene latex, or mixtures of two or more that binds the particles of carbonaceous material together in a porous manner. A satisfactory binder is polytetrafluoroethylene which may be applied initially as a suspension and then heated to a porous solid. The carbon particles have a surface area of from about 5 to 500 square meters per gram. The amount of binder may vary from about 5 to 50 weight percent of the total composition of the layer 12. The preferred percentage of the resinous binder, however, dependent in part upon the electrode thickness, is about 20 weight percent.

The catalyzed layer 14 is composed of particles of a material similar to that of the layer 12 as well as of a binder similar to that used in the layer 12. However, inasmuch as the layer 14 is a more hydrophobic member to prevent the passage of electrolyte to the gas side as viewed in FIG. 1, a greater percentage of resinous binder is used to obtain a greater hydrophobicity of the layer. For that purpose the amount of binder in the layer 14 may vary from about 20 to about 50 weight percent of the total composition of the layer 14 and preferably 30% and higher. In addition, the layer 14 includes a suitable catalyst, good results being had with at least one of the metals of the platinum group, and gold and silver. It will be understood that other catalysts may be used. Their choice depends on the reaction proceeding at the electrode. Thus for the oxygen electrode, members of the transition elements or mixtures thereof, or silver, gold, or their mixtures with metal oxides, are examples of efficient catalysts. Inexpensive catalysts such as cobalt oxide, manganese oxide or mixed oxides of the spinel structure (such as oxides of Al, Mn, and Fe may be added over the entire electrode. It is important that the catalyst is added only to the layer 14.

In addition, a filler may be added to either or both layers 12 and 14 to improve the mechanical strength or the diffusion characteristics of the electrode. As an example, the filler may be fine fibrous potassium titanate in an amount varying from about 5 to 25 weight percent, with good results being had at about 15 weight percent, of the electrode.

The metal conductor 16 may be a wire mesh member, an expanded metal member, a perforated metal sheet, or a compressed metal wool member. The conductor is preferably composed of nickel as such or plated with a noble metal such as gold. The layers 12 and 14 will penetrate into the interstices or openings of conductor 16.

The layers 12 and 14 are separately applied to opposite sides of the conductor 16 so as to completely cover and penetrate the openings of the conductor. The desired thickness of the electrode 10 will vary from about 10 to 30 mils with the backing layer 12 being at least twice the thickness of the catalyzed layer 14. For the outstanding results desired, the layer 14 must have a thickness of from 3 to 7 mils. Excellent results were obtained when the thickness of the layer 14 is about ⅓ the thickness of the complete electrode 10.

The active mass of the catalyzed layer 14 is composed of three ingredients containing from about 50 to 80 weight percent of carbon black (where carbon is used) and from about 20 to 50 weight percent of binder, based as the total of the mixture of carbon and hydrophobic binder. A catalyst is added to the mixture in an amount varying about 0.1 to 10 milligrams per square cm. of geometric electrodes area. Typical percentages for an excellent electrode are about 70% of fine carbon black, 30% polytetrafluoroethylene binder, and about 1 mg./sq. cm. of silver in an oxygen electrode.

The carbon ingredients for each layer 12 and 14 are thoroughly mixed with the suspension of a hydrophobic binder (such as a suspension of polytetrafluoroethylene) and sufficient water to produce a stiff paste. Each layer 12 and 14 is then applied separately to the corresponding side of the conductor 16.

The electrode 10 is placed between a pair of sheets of porous polyvinyl chloride which in turn are placed between a pair of sheets of filter paper to absorb the water. The foregoing assembly is then compressed either by pressing or rolling to remove excess water and to uniformly distribute the paste material on the conductor and into the interstices to form a well bonded assembly. Rolling is repeated from three and ten times under increasing pressure in varying directions to achieve optimum distribution of the material of the layers and to produce a uniformly thick electrode.

After additional drying in air the electrode 10 is gradually heated to a temperature ranging from about 60° C. to about 350° C. For example, when the binder is a Teflon suspension the drying temperature varies from about 280° C. to 350° C. The electrode 10 is then hot pressed between metal foil sheets at about the same temperature under a load of about 100 pounds per square centimeter of electrode area. After removal of the foil, a usable electrode is obtained.

Figure 2:
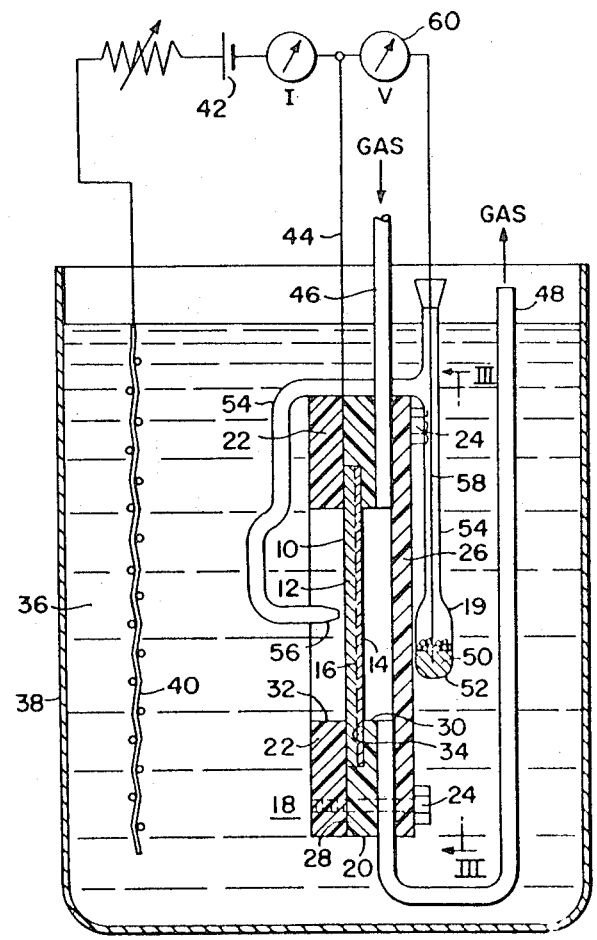
FIG. 2 is a schematic view showing the manner in which a gas diffusion electrode is mounted for testing in an electrolyte in conjunction with an auxiliary electrode.

The resulting electrode 10 is tested against an inert counter-electrode 40 in a driven circuit, such as shown in FIG. 2, for which purpose it is placed in an electrode holder generally indicated at 18, and in conjunction with a reference electrode 19.

Figure 3:
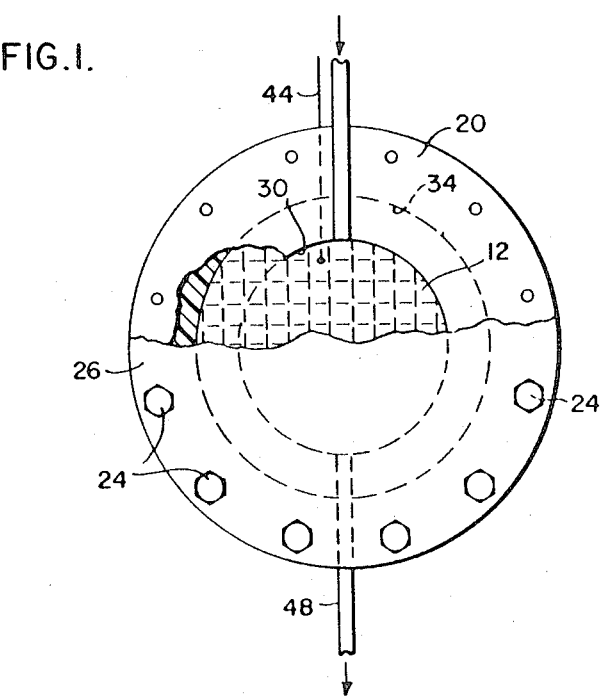
FIG. 3 is a vertical sectional view taken on the line III—III of FIG. 2.

The electrode holder 18 includes a body member 20 and a frame member 22 which are held together by suitable means such as spaced bolts 24. The body member 20 includes a plate portion 26 and an annular portion 28 forming a central opening 30, one side of which is closed by the plate portion. The frame member 22 is annular and forms an opening 32 which is aligned with the opening 30. As shown in FIGS. 2 and 3, the annular portion 28 has a peripheral groove 34 for receiving the peripheral edge portion of the electrode 10 where it is retained in place by the frame member 22 shown in FIG. 2.

As shown in FIG. 2, the assembly of the electrode holder 18 and the electrode 10 is immersed in an electrolyte 36, such as aqueous KOH, contained in a container 38. A counter electrode 40, composed of a metal mesh such as platinum or nickel, is likewise immersed in the electrolyte 36. The cell including the electrodes 12 and 40 in the electrolyte 36 is driven by a 12 volt battery 42 for testing with the electrode 12 connected to the circuit by a lead wire 44, which extends between the interfaces of the frame member 22 and the portions 28, and which is connected to the upper end of the grid conductor 16.

The electrode holder 18 is provided with an inlet tube 46 and an outlet tube 48 which communicate with the portion of the opening 30 between the plate portion 26 and the electrode 10, whereby the active gas such as oxygen is in contact with the catalyzed layer 14. In addition to introducing the gas into the holder 18 the tubes 46 and 48 provide for removing any drops of electrolyte 36 which may penetrate or seep through the electrode 10 to the oxygen side. Thus, drops of electrolyte are carried away from the gas side of the electrode and are forced out by the gas through tube 48 and into the electroltye. Due to the relatively lower thickness of the catalyzed layer 14, compared with the layer 12, any seeping or flooding of the layer 14 by the electrolyte is not detrimental to the efficient operation of the electrode because the relatively thin layer 14 offers substantially no resistance to penetration of the layer 14 by the gas.

The reference electrode 19 is used in conjunction with a Luggin capillary having an opening 56 which is located about two mm. from the surface of the electrode 10, in order to measure the potential of the electrode against a point in the electrolyte located as closely as possible to the electrode 10. The electrode 19 includes a mercury-mercury oxide mixture 50 located in a glass bulb 52 that communicates via in inverted U-shaped glass tube 54 with the Luggin capillary opening 56 on the electrolyte side of the electrode 10. The tube 54 is filled with electrolyte 36. The tube 54 is U-shaped to facilitate attachment of the electrode 19 and the electrode holder 18. A platinum wire 58 leads from the Hg/HgO mixture 50 to one side of a high impedance, voltmeter 60, the other side of which is connected to the electrode 10. When air is used as an active gas and the electrolyte is alkaline (KOH), the air before entering the device is preferably scrubbed by passing it through an alkaline solid absorbent or an alkaline solution. This removes the carbon dioxide from the air which reacts with the electrolyte and tends to destroy the structure of the electrode by forming deposits in the pores. Other impurities like $SO_2$ are simultaneously removed which may poison a catalyst like silver.

Figure 4:
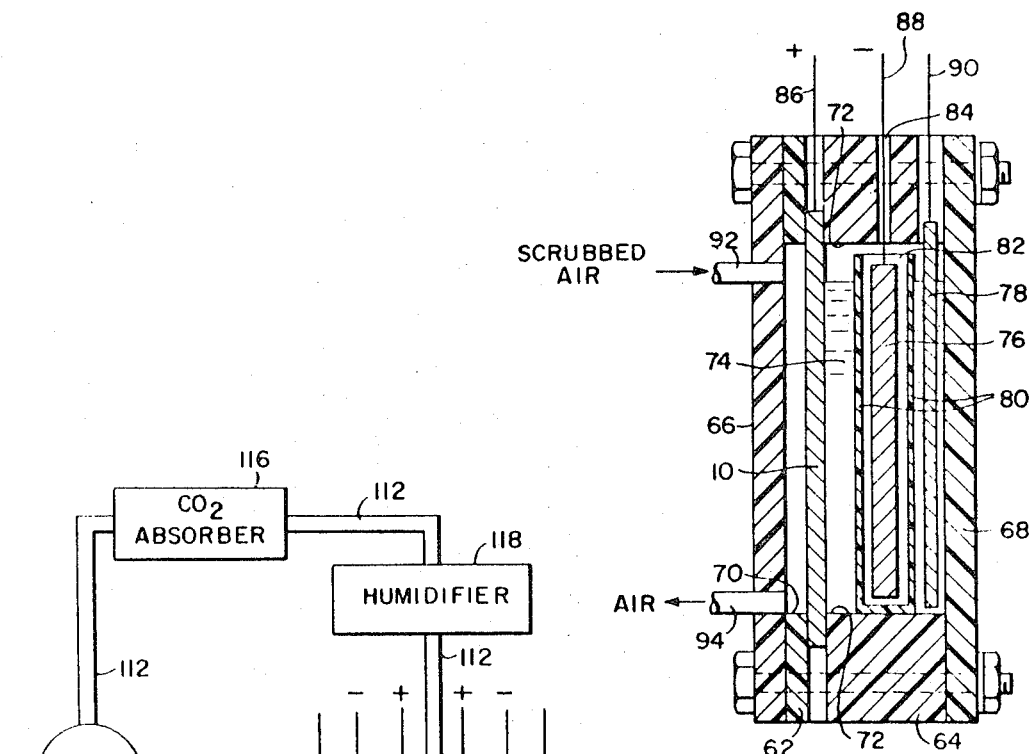
FIG. 4 is a schematic view showing a gas diffusion electrode mounted in an electrolyte in conjunction with a metal electrode.

In actual use as an air electrode in a metal-air battery, the electrode 10 is employed as shown in FIG. 4. For that purpose the electrode 10 is mounted between a pair of frame members 62 and 64 which are disposed between end plates 66 and 68. An air chamber 70 is provided between the end plate 66 and the electrode 10. Likewise, a chamber 72 is provided between the electrode 10 and the end plate 68 which chamber is filled with electrolyte 74. An electrode 76 and a charging electrode 78 (for recharging the battery) are disposed in the chamber 72 and within the electrolyte. The electrode 76 is composed of an oxidizable metal such as iron. The charging electrode 78 is composed of an inert metal such as nickel. The electrode 76 is encased in an envelope 80 having an open top 82. The enevelope 80 serves as a separator consisting of a sheet of cellophane sandwiched between sheets of fibrous polypropylene. When discharging the battery, the oxygen electrode is positive with respect to the metal electrode. When charging, the charging electrode is positive with respect to the metal electrode.

A vent 84 in the frame member 64 is provided to permit the escape of gases from the electrode 76 which is charged against the electrode 78. A Luggin capillary (not shown) may be disposed in the space between the electrodes 10 and 76 such as in a manner described in FIG. 2. Wire leads 86, 88 and 90 extend from the electrodes 10, 76 and 78, respectively. An air inlet 92 and an air outlet 94 are provided in the end plate 66. The air outlet 94 is located at the lower end of the chamber 70 to enable drainage of electrolyte that may penetrate or seep through the electrode 10.

Figure 5:
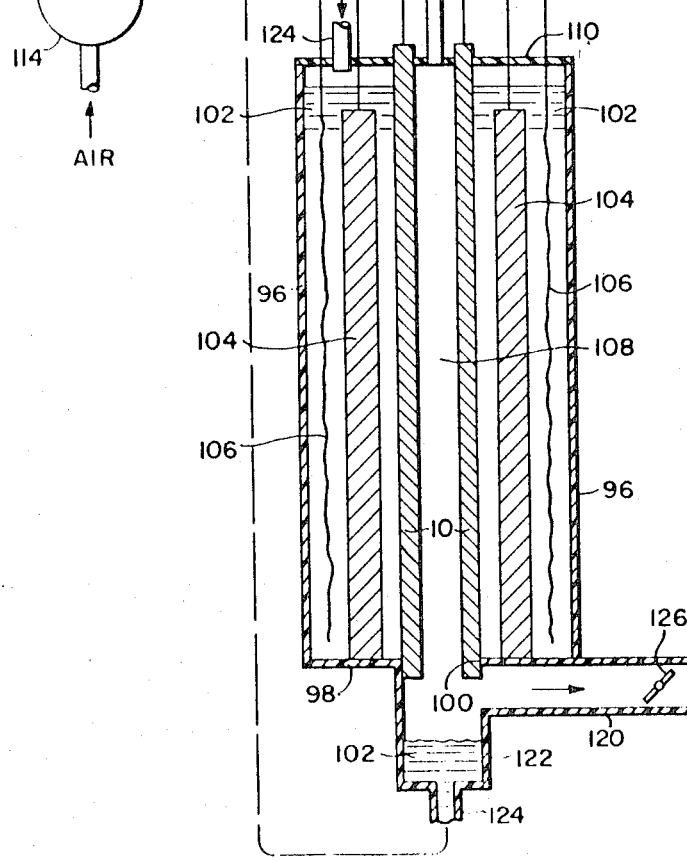
FIG. 5 is a vertical cross-section of a modified form of a fuel cell.

The electrode 10 may be employed as shown in FIG. 5 in a container 96. A bottom wall 98 of the container is provided with an opening 100 that communicates with means for draining electrolyte seepage and for venting air (or oxygen) from the system. A pair of rectangular electrodes 10 are mounted in spaced relation within the container 96 and in liquid-tight contact with the container surfaces. Electrolyte 102 is disposed in the chambers between the electrodes 10 and the container 96. A metal electrode 104 is immersed on each side of the assembly. In addition, a charging electrode 106 is disposed in each side of the container. When discharging the battery, the oxygen electrodes 10 are positive with respect to the metal electrodes 104. When charging the battery, the charging electrodes 106 are positive with respect to the metal electrodes 104.

As shown in FIG. 5 the electrodes 10 provide a clearance space 108 from which the electrolyte 102 is excluded. The space 108 extends vertically from the top of the container 96 to the opening 100. The upper end of the space 108 is closed by a member 110 through which a conduit 112 extends for introducing gas (air or oxygen) into the space. The conduit 112 includes means such as a fan 114 for moving the gas through an air purifier 116 (such as a $CO_2$ absorber) and a humidifier 118.

In the space 108 the gas contacts the electrodes 10 and exits from the space through the opening 100 where it is exhausted through a vent 120. Any electrolyte 102 that seeps through the electrodes 10 is collected in a trap 122 from which it is conveyed through a conduit 124 to the upper end of the container 96 and returned to system. For that purpose a baffle 126 is provided in the vent 120 intermittently or continuously to provide pressure sufficient to cause the electrolyte to flow to the upper end of the conduit 124.

The seat of the electrochemical activity is a narrow zone where electrolyte and gas meet. This zone in the invention is located in the narrow catalyzed layer 14, which is adjacent to the gas phase. The advantage of positioning the reaction zone close to the gas phase is the short diffusion path for the gas and the resulting high output. It is critical to the successful and efficient operation of the electrode that the layer 14 be as thin as possible i.e. 3 to 7 mils and not over half the thickness of the layer 12, in order to expedite access to the active zone of the gas. A further advantage of the invention is the relatively small amount of catalyst required as a consequence of the reduced thickness of the layer.

The following examples illustrate the practice of the invention:

EXAMPLE I

A circular air electrode was prepared having a total area of 20 square centimeters and a total thickness of 12 mils. The backing or liquid electrolyte layer of a final thickness of slightly over 8 mils, was composed of a mixture of 175 mg. of conducting carbon black and a suspension containing 45 mg. of finely divided polytetrafluoroethylene with sufficient water present to form a stiff paste. The mixture was spread over one side of an expanded nickel mesh that was silver plated. The mesh was about 6 mils thick having openings of about 5 $mm.^2$.

Excess moisture was removed by placing a porous sheet of polyvinyl chloride (PVC) immediately under the nickel mesh and a sheet of filter paper under the sheet of PVC.

The subassembly of the mesh and backing layer was then inverted. The sheets of PVC and filter paper were removed from the mesh and were placed against the backing layer on the side opposite of the mesh. A catalyzed layer was then applied to the other side of the mesh. The catalyzed layer, of a final thickness of slightly less than 4 mils, was composed of a mixture of 80 mg. of a conducting carbon black and a suspension containing 50 mg. of solid polytetrafluoroethylene. To the mixture were added 32 mg. of silver nitrate (to give 1 mg. of metallic silver per square cm. of electrode area) dissolved in sufficient water to produce a stiff paste. The mixture was applied on the other side of the mesh and excess moisture was absorbed by additional sheets of PVC and filter paper applied in a manner similar to the backing layer.

The electrode, consisting of the backing layer and the catalyzed layer, with sheets of PVC and filter paper on opposite outer sides was then compacted by passing it through a pair of rollers in various directions. As a result layers were evenly distributed, and excess water was pressed out. Subsequently, the electrode was slowly heated to about 350° C. in a furnace and hot pressed under a 2000 lbs. load at 300° C.

The electrode was then placed in an electrolyte solution containing 27% KOH at a temperature of 25° C. The catalyzed layer faced the gas side and the backing layer faced the electrolyte in a driven cell similar to that shown in FIG. 2. Results were obtained for oxygen and air and plotted as shown in FIG. 6. As a result of the high diffusion rates obtained by the positioning of the active zone close to the gas phase, the polarization (energy loss) at high current densities was low and a relatively flat characteristic was obtained. The small difference obtained for the potential when operated with air instead of oxygen showed that the nitrogen in the air did not accumulate in the pores to an appreciable extent. The small amount of silver catalyst required for obtaining the relatively low polarization shows the efficient utilization of catalyst in the electrode.

EXAMPLE II

An electrode was prepared similar to that of Example I except that the backing layer was composed of a mixture containing 175 mg. of conducting carbon black and a Teflon 30 suspension containing 25 mg. of solid Teflon with sufficient water to form a stiff paste. The catalyzed layer composition differed from that of Example I in that 2.5 mg. of platinum metal per square centimeter (as chloroplatinic acid) were dispersed on the carbon instead of silver. The air layer was less than 4 mils thick while the electrolyte layer was slightly over 8 mils thick. The electrode was tested in an electrolyte solution of 30% KOH in a driven circuit with the catalyzed layer facing the oxygen or air stream. The output was very similar to that of the electrode of Example I.

EXAMPLE III

An electrode substantially similar to that of Example I was prepared with following exceptions. The backing layer was composed of 150 mg. of carbon, 75 mg. of polytetrafluoroethylene solids, and 40 mg. of fibrous potassium titanate as a filler, and was applied as a stiff paste onto one side of a nickel mesh having 60 x 60 wires per square inch. The nickel mesh was gold plated. The gas side catalyzed layer contained 66 mg. of carbon, 66 mg. of polytetrafluoroethylene, 20 mg. of potassium titanate, and 53 mg. of chloroplatinic acid (to give 1 mg. of platinum per square centimeter of electrode). The backing layer was cold pressed at 15,000 lbs. on the mesh before applying the catalyzed layer. After the catalyzed layer was applied, the assembly was again pressed under a load of 15,000 lbs. The electrode was then slowly heated as in Example I. When tested in an electrolyte, the electrode displayed satisfactory mechanical shape and strength and the electrical output was satisfactory but not as good as those of Examples I and II.

EXAMPLE IV

An electrode was prepared similar to that of Example I except that the backing layer was composed of 180 mg. of carbon and of 75 mg. of Teflon with sufficient water to form a stiff paste. The catalyzed layer was composed of 80 mg. of carbon, 66 mg. of Teflon, and 53 mg. of chloroplatinic acid to give 1 mg. of metallic platinum per square centimeter electrode. Each layer was applied to a side of a gold-plated woven nickel mesh and cold-pressed in place. The electrode assembly was then heated in a furnace to 350° C. in an oxygen atmosphere, flushed with nitrogen, and then treated with hydrogen for 35 minutes. After cooling in nitrogen, it was hot-pressed at 300° C. under 2000 lbs. load. When tested with oxygen in an electrolyte of 30% KOH in the test set-up of FIG. 2, the potential of the electrode against the Hg/HgO reference was $-0.21$ volt at 100 ma./cm.$^2$. After removal from the electrolyte, the electrode was washed and a dilute solution of a mixture of cobalt acetate and magnesium acetate was applied several times to the backing layer and drawn into the electrode by applying a vacuum from the other side. The electrode was then dried, heated, and hot-pressed, as before. On testing, the polarization was decreased, the potential of the electrode being $-0.18$ volt at 100 ma./cm.$^2$.

EXAMPLE V

An electrode substantially similar to that of Example I was prepared with the following exceptions. The electrode had a square shape (49 square cm. area). The backing layer was composed of 425 mg. of carbon, 110 mg. of polytetrafluoroethylene. The catalyzed layer contained 295 mg. of carbon, 183 mg. of polytetrafluoroethylene, and one mg. of silver per cm.$^2$ which last was applied in the form of silver nitrate. The conductor was an expanded nickel mesh plated with silver. The electrode was heated in air at 350° C. and hot presed at 280° C. under a load of 4000 lbs. to a final thickness of 15 mils.

The electrode was tested against an iron electrode containing 15 weight/percent of sulfur. After forming the iron electrode by repeated charging and discharging in an auxiliary set-up, it was paired with the gas diffusion electrode in the manner shown in FIG. 4. The rechargeable battery was operated by charging the iron electrode against a charging nickel electrode (such as in FIG. 4), and by discharging against the air electrode. The output of the electrode was satisfactory in view of the sulfur content of the iron electrode which tends to poison the silver catalyst. During the first 500 hours, when drawing a current of 600 ma. (18.5 ma./cm.$^2$), the average potential of the air electrode was between $-0.13$ and $-0.17$ volt against a Hg/HgO reference electrode.

EXAMPLE VI

An early, mechanically, rather imperfect electrode was put on a long-term test to study the effect of electrolyte penetration on the output of the electrodes of the present invention which have the active three-phase zone adjacent to the gas side. An electrode of 20 cm.$^2$ area was produced on a 60 x 60 mesh silver net of 9 mil thickness. The electrolyte side contained 250 mg. of carbon and 50 mg. of Teflon. The air side contained 100 mg. of carbon, 100 mg. of Teflon and 1 mg./cm.$^2$ of platinum, applied as chloroplatinic acid. The electrolyte side layer was twice as thick as the air side layer of the electrode, the air side layer being about 5 mils thick.

The electrode was made by spreading the foregoing compositions on opposite sides of the net with a spatula and heating the electrode on a hot plate for drying. Any cracks appearing during contraction of the compositions during drying were repaired with a wetted spatula. The electrode was then heated in a nitrogen (10% hydrogen) mixture to 350° C. and was hot pressed at about 250° C. at 2000 lbs. load.

When tested in the manner shown in FIG. 2, the electrode leaked electrolyte in view of its fragile structure. Nevertheless, it operated as an oxygen electrode for about 10,000 hours, most of the time at 100 to 150 ma./cm.$^2$. Occasional stoppage of the oxygen supply caused complete flooding of the electrode and filling of the air space with electrolyte. However, upon resumption of the oxygen supply the electrolyte was forced out of the space on the gas side, and the electrode continued to function satisfactorily. After 7000 hours at room temperature the potential against the Hg/HgO reference electrode was as high as $-0.13$ volt at 100 ma./cm.$^2$.

An air electrode was prepared in a manner similar to that of Example I except that the backing layer was composed of 14 mg. per cm.$^2$ of fine carbon, 2 mg. per cm.$^2$ of polytetrafluoroethylene (the solid polytetrafluoroethylene being "Teflon 30" suspension). The catalyzed layer contained 6.4 mg. per cm.$^2$ of fine carbon, 2.8 mg. per cm.$^2$ of polytetrafluoroethylene and 2.56 mg. per cm.$^2$ of $AgNO_3$ (to yield 1.6 mg. of silver metal, 40% of which was lost during preparation of the final electrode). The backing layer was slightly over 8 mils thick and the catalyzed layer was less than 4 mils thick. The overall electrode was 7 cm. x 7 cm. and from 12 to 14 mils thick. The electrode was tested in a cell similar to that shown in FIG. 2 for a period of 387 days with execellent results throughout the test. The test was voluntarily terminated at the end of this time.

The results obtained were outstanding and superior to other electrodes both in length of successful operation as the excellent electrode operation. The electrode so produced is of the highest reliability. The optimum rate of reaction appears to have been obtained by reason of the 3 to 7 mil thickness of the gas side layer as well as the fact that the catalyst is present therein. Our tests have indicated that these elecrodes have consistently exhibited the highest efficiency that has been obtained with gas diffusion electrodes.

The amount of catalyst employed has been extremely low but has been completely adequate for the purpose.

While the best known embodiments of the invention have been illustrated and described in detail, it is understood that the invention is not limited thereto or thereby.

What is claimed is:

1. A gas diffusion electrode for sustaining an electrode reaction of a gas fed into one side of the electrode with a liquid electrolyte permeating the opposite side of the electrode, the electrode comprising a coherent porous body having a gas-entrance side and a liquid electrolyte-contacting side; the porous body consisting of a porous metal conductor and two layers applied thereto, a catalyzed layer being on the gas-entrance side and a non-catalyzed layer being on the liquid electrolyte-contacting side of the porous metal conductor, the layers being disposed on opposite sides of the porous metal conductor and bonded into an integral body; the liquid electrolyte contacting non-catalyzed layer being readily pervious to liquid electrolyte so that liquid electrolyte will be conveyed to the porous metal contacting side of the gas entrance catalyzed layer, each of the layers structurally consisting essentially of particles of an electrically conductive carbonaceous material inert to the electrolyte as the major component and a resinous binder inert to the electrolyte uniting the particles of carbonaceous material; the carbonaceous particles having a surface area of from about 5 to 500 square meters per gram; the resinous binder in the gas-entrance side layer rendering it hydrophobic and the binder being present in an amount of from about 20 to 50 weight percent of the total composition of the layer; a catalyst distributed throughout the gas-entrance side layer; the catalyzed gas-entrance side layer being from about 3 to about 7 mils in thickness; the liquid electrolyte-contacting side layer being at least about twice the thickness of the gas-entrance side layer, the binder being present in an amount of from about 5 to 50 weight percent of the total composition of the layer, whereby in use of the electrode there is present a three-phase zone of liquid electrolyte, gas, and conductive particles within the gas side layer of the electrode so as to provide a minimum gas diffusion path with a resulting high efficiency, reliability, and optimized rate of reaction.

2. The electrode of claim 1 wherein the carbonaceous material is finely divided carbon.

3. The electrode of claim 1 wherein the hydrophobic resinous binder in the gas-entrance side layer is present in an amount sufficient to allow gas to permeate therethrough while preventing liquid electrolyte from passing therethrough.

4. The electrode of claim 1 wherein the catalyst present in the gas-entrance side layer comprises a material selected from at least one of the group consisting of metals of the platinum group, gold, silver, the transition elements, oxides of gold, silver, cobalt, and manganese, and mixed oxides of the spinel structure; and is present in an amount of from about 0.1 to 10 milligrams per square centimeter of the electrode area.

References Cited

UNITED STATES PATENTS

| | | | |
|---|---|---|---|
| 3,306,779 | 2/1967 | Flannery et al. | 136—120 |
| 3,423,247 | 1/1969 | Darland, Jr. et al. | 136—120 |
| 3,480,538 | 11/1969 | Sturm | 204—290 |
| 3,451,856 | 6/1969 | Fraase et al. | 136—120 |
| 3,385,780 | 5/1968 | Feng | 204—294 |
| 3,513,029 | 5/1970 | Giner et al. | 136—86 |

ANTHONY SKAPARS, Primary Examiner

U.S. Cl. X.R.

136—121